US012691539B2

(12) United States Patent　(10) Patent No.:　US 12,691,539 B2
Marchetti　(45) Date of Patent:　Jul. 28, 2026

(54) MACHINE TOOL FOR MACHINING SEMI-FINISHED ALUMINIUM ALLOY OR TITANIUM ALLOY PRODUCTS

(71) Applicant: INNSE-BERARDI S.P.A. SOCIETA' UNIPERSONALE, Brescia (IT)

(72) Inventor: Marcello Marchetti, Brescia (IT)

(73) Assignee: INNSE-BERARDI S.P.A., Brescia (IT)

( * ) Notice: Subject to any disclaimer, the term of this patent is extended or adjusted under 35 U.S.C. 154(b) by 219 days.

(21) Appl. No.: 18/559,506

(22) PCT Filed: Apr. 20, 2022

(86) PCT No.: PCT/IB2022/053694
§ 371 (c)(1),
(2) Date: Nov. 7, 2023

(87) PCT Pub. No.: WO2022/243762
PCT Pub. Date: Nov. 24, 2022

(65) Prior Publication Data
US 2024/0238929 A1　　Jul. 18, 2024

(30) Foreign Application Priority Data

May 20, 2021　(IT) ........................ 102021000013130

(51) Int. Cl.
B23Q 5/00　　(2006.01)
B23Q 1/62　　(2006.01)
B23Q 5/38　　(2006.01)

(52) U.S. Cl.
CPC ............. B23Q 5/385 (2013.01); B23Q 1/623 (2013.01)

(58) Field of Classification Search
CPC ........ B23Q 1/621; B23Q 5/385; B23Q 1/623; F16H 19/04; F16H 25/20; B23P 23/02
See application file for complete search history.

(56) References Cited

U.S. PATENT DOCUMENTS 5,688,084 A * 11/1997 Fritz ........................ B23Q 5/28
483/58
2018/0099367 A1 * 4/2018 Repossini .............. B23Q 1/623
(Continued)

FOREIGN PATENT DOCUMENTS

CN　　　1846916 A　　10/2006
CN　　200945556 Y　　9/2007
(Continued)

OTHER PUBLICATIONS

International Search Report, issued in PCT/IB2022/053694, mailed Jul. 7, 2022, Rijswijk, NL.
(Continued)

*Primary Examiner* — Zakaria Elahmadi
(74) *Attorney, Agent, or Firm* — ArentFox Schiff LLP; Michael Fainberg

(57)　　　ABSTRACT

A machine tool for machining semi-finished aluminum or titanium alloy products which has a supporting structure, an upright, a carriage and a working head is provided. The supporting structure has a bench and a rear support rigidly connected to each other. The bench extends along a longitudinal direction, while the rear support extends both along the longitudinal direction and along a vertical direction. The supporting structure is provided with upright translation elements. The upright is connected to the supporting structure by the upright translation elements, so as to translate along the longitudinal direction and is further provided with carriage translation elements. The carriage is connected to the upright by the carriage translation elements so as to be translatable along the vertical direction. The working head is engaged with the carriage. The machine tool has four pairs of gearmotors positioned aboard the upright and engaged with the upright translation elements.

15 Claims, 8 Drawing Sheets

(56) References Cited

U.S. PATENT DOCUMENTS

| | | | | |
|---|---|---|---|---|
| 2018/0104784 | A1* | 4/2018 | Suzuki | B23Q 11/0825 |
| 2021/0354383 | A1* | 11/2021 | Harra | B22F 12/30 |

FOREIGN PATENT DOCUMENTS

| | | | | | |
|---|---|---|---|---|---|
| CN | 104551717 | A | * | 4/2015 | B23P 23/02 |
| CN | 104668638 | A | | 6/2015 | |
| CN | 105656244 | A | | 6/2016 | |
| CN | 108311899 | A | | 7/2018 | |
| DE | 202007013009 | U1 | | 1/2009 | |
| EP | 1270143 | A1 | * | 1/2003 | B23Q 5/56 |
| EP | 1402991 | A2 | * | 3/2004 | B23Q 7/1431 |
| EP | 1366849 | B1 | * | 7/2005 | B23Q 37/00 |
| EP | 3308903 | A1 | * | 4/2018 | B23Q 1/26 |
| JP | H1199424 | A | | 4/1999 | |
| JP | WO2009028329 | A1 | * | 11/2010 | B23D 13/02 |

OTHER PUBLICATIONS

Office Action received for Chinese Patent Application No. 202280035428.2, mailed on Nov. 27, 2025, 17 pages (8 pages of English Translation and 9 pages of Original Document).

Office Action received for Chinese Patent Application No. 202280036182.0, mailed on Dec. 11, 2025, 15 pages (8 pages of English Translation and 7 pages of Original Document).

* cited by examiner

MACHINE TOOL FOR MACHINING SEMI-FINISHED ALUMINIUM ALLOY OR TITANIUM ALLOY PRODUCTS

CROSS-REFERENCE TO RELATED APPLICATIONS

This application is a National Phase Application of PCT International Application No. PCT/IB2022/053694, having an International Filing Date of Apr. 20, 2022 which claims priority to Italian Application No. 102021000013130 filed May 20, 2021, each of which is hereby incorporated by reference in its entirety.

FIELD OF THE INVENTION

The present invention relates to the field of machine tools, and in particular to the technical field of large machine tools, such as a horizontal boring machine or a milling machine or a lathe. In particular, the present invention relates to a machine tool suitable to machine semi-finished aluminum alloy or titanium alloy products.

BACKGROUND OF THE INVENTION

Such machine tools are used to carry out mechanical machining on large semi-finished products for the aeronautical, aerospace and naval industries.

Due to the criticality of such industrial applications, extremely low machining tolerances are generally required. Machine tool manufacturers are therefore constantly engaged in the research and development of solutions which may guarantee these tolerances.

In the case of semi-finished titanium alloy machining, it is observed that, during the chip removal operations, the tool develops vibrations with a frequency of between 12 and 18 Hz. Considering that the resonant frequency of machine tools according to the prior art is between 14 and 16 Hz, it is clear to those skilled in the art that the machining of titanium alloys produces vibrations in the resonance range of the machines, which in fact prevent the tolerances required by the industrial applications for which the finished piece is intended from being obtained.

On the other hand, in the case of machining of semi-finished aluminum alloy products, compliance with dimensional tolerances requires very long production times. It is clear that, by increasing the rigidity of the machine and increasing the value of the first resonant frequency, the dynamic performance of the machine tool would improve and consequently the production times could be reduced without compromising the respect of the required tolerances.

Therefore, in order to comply with tolerances and/or improve dynamic performance, machine tools should be rigid enough to guarantee a resonant frequency of between 23 and 30 Hz.

So far, the efforts made by manufacturers have been aimed at increasing the rigidity of the machines. While it is possible to improve the stiffness through an increase in the stiffness of the machine structures, this technical prejudice, however justified by structural science, has not so far produced any satisfactory results.

SUMMARY OF THE INVENTION

The object of the present invention is to provide a large-sized machine tool capable of obviating the drawbacks mentioned above.

Such object is achieved by a machine tool for machining semi-finished aluminum alloy or titanium alloy products as described and claimed herein. Advantageous embodiments of the present invention are also described.

BRIEF DESCRIPTION OF THE DRAWINGS

The features and the advantages of the machine tool according to the present invention shall be made readily apparent from the following description of preferred embodiment examples thereof, provided purely by way of a non-limiting example, with reference to the accompanying figures, in which.

DETAILED DESCRIPTION

Figure 1:
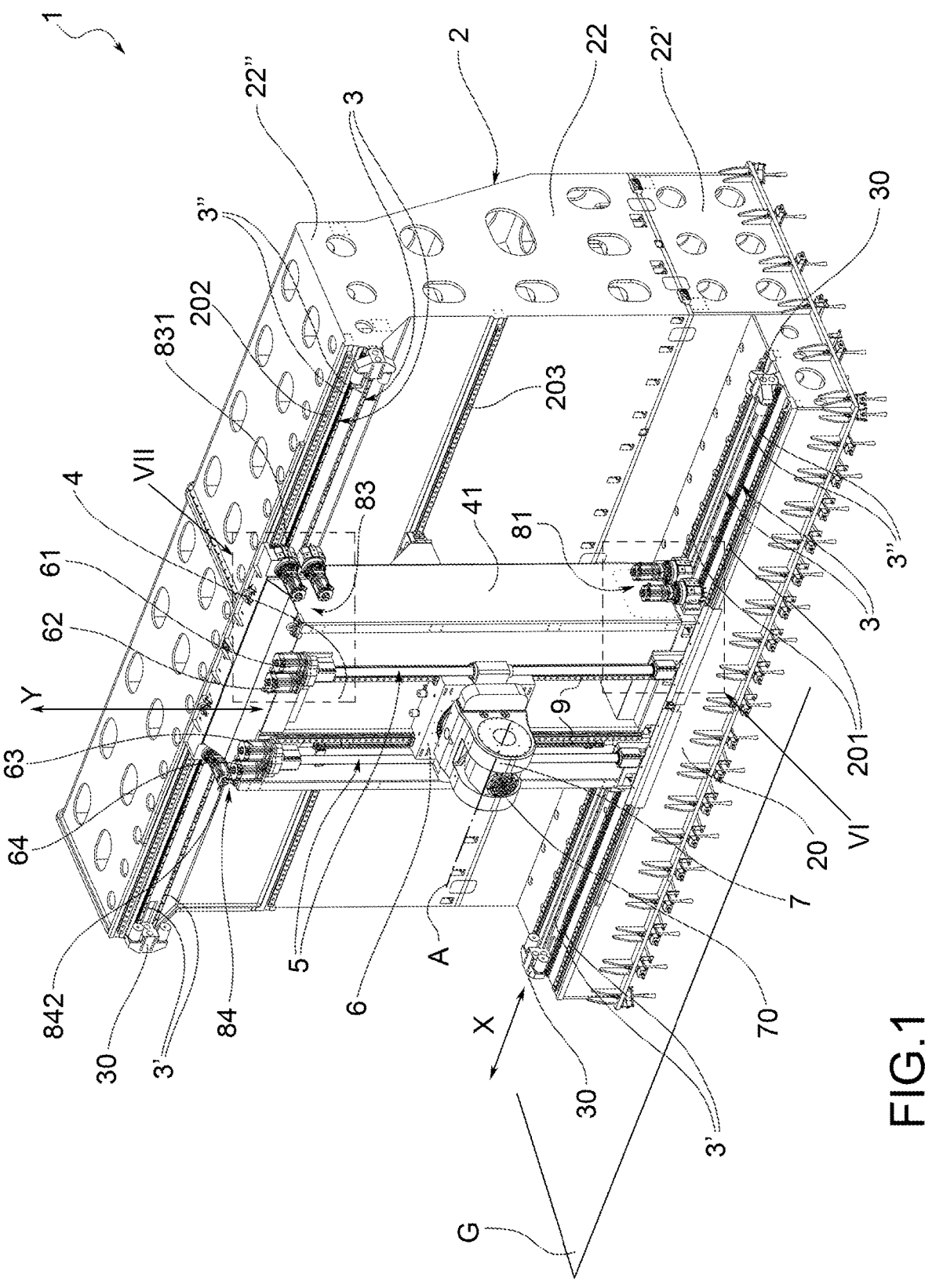
FIG. 1 is a perspective view of a machine tool in one embodiment.

In the following description, elements common to the various embodiments represented in the drawings are indicated with the same reference numerals.

With reference to the figures of the accompanying drawings, the reference numeral 1 generally indicates a machine tool suitable to machine semi-finished aluminum alloy or titanium alloy products.

In a general embodiment, the machine tool 1 for machining semi-finished aluminum alloy or titanium alloy products is designed to rest on a horizontal reference plane G, for example the ground plane. Such machine tool 1 comprises a supporting structure 2, an upright 4, a carriage 6 and a working head 7.

The supporting structure 2 comprises a bench 20 and a rear support 22. The bench 20 has a main extension along a longitudinal direction X, while the rear support 22 extends both along the longitudinal direction X and along a vertical direction Y.

The bench and the rear support are rigidly connected to each other, i.e. engaged and made integral. For example, the bench 20 and the rear support 22 are connected in such a way that the supporting structure 2 has an "L"-shaped cross section, where such cross section is meant to be obtained along a plane orthogonal to the longitudinal direction X.

The supporting structure 2 is also provided with upright translation means 3 oriented according to the longitudinal direction X.

The upright 4 is connected to the supporting structure 2 by means of the upright translation means 3, so as to translate along the longitudinal direction X. Such upright 4 is further provided with carriage translation means 5 oriented according to the vertical direction Y.

The carriage 6 is connected to the upright 4 by means of the carriage translation means 5 so as to be translatable along the vertical direction Y.

The working head 7 is engaged with the carriage 6 and has a tool holder seat 70 suitable to house a tool for chip removal machining.

The machine tool 1 further comprises four pairs of gearmotors 81, 82, 83, 84 which are positioned aboard the upright 4 and engage with the upright translation means 3.

Figure 6:
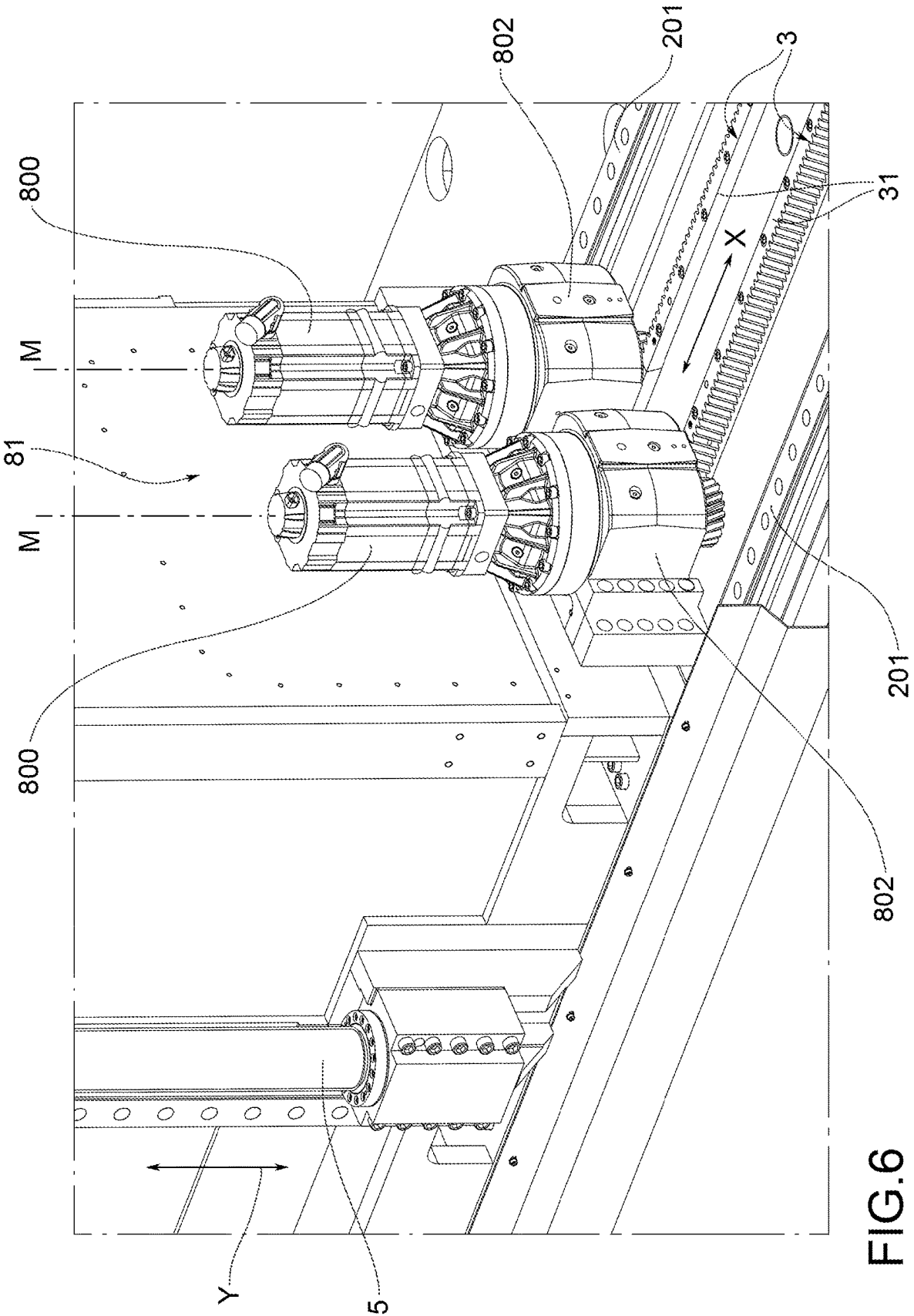
FIG. 6 is an enlarged view of the detail VI highlighted in FIG. 1.
Figure 7:
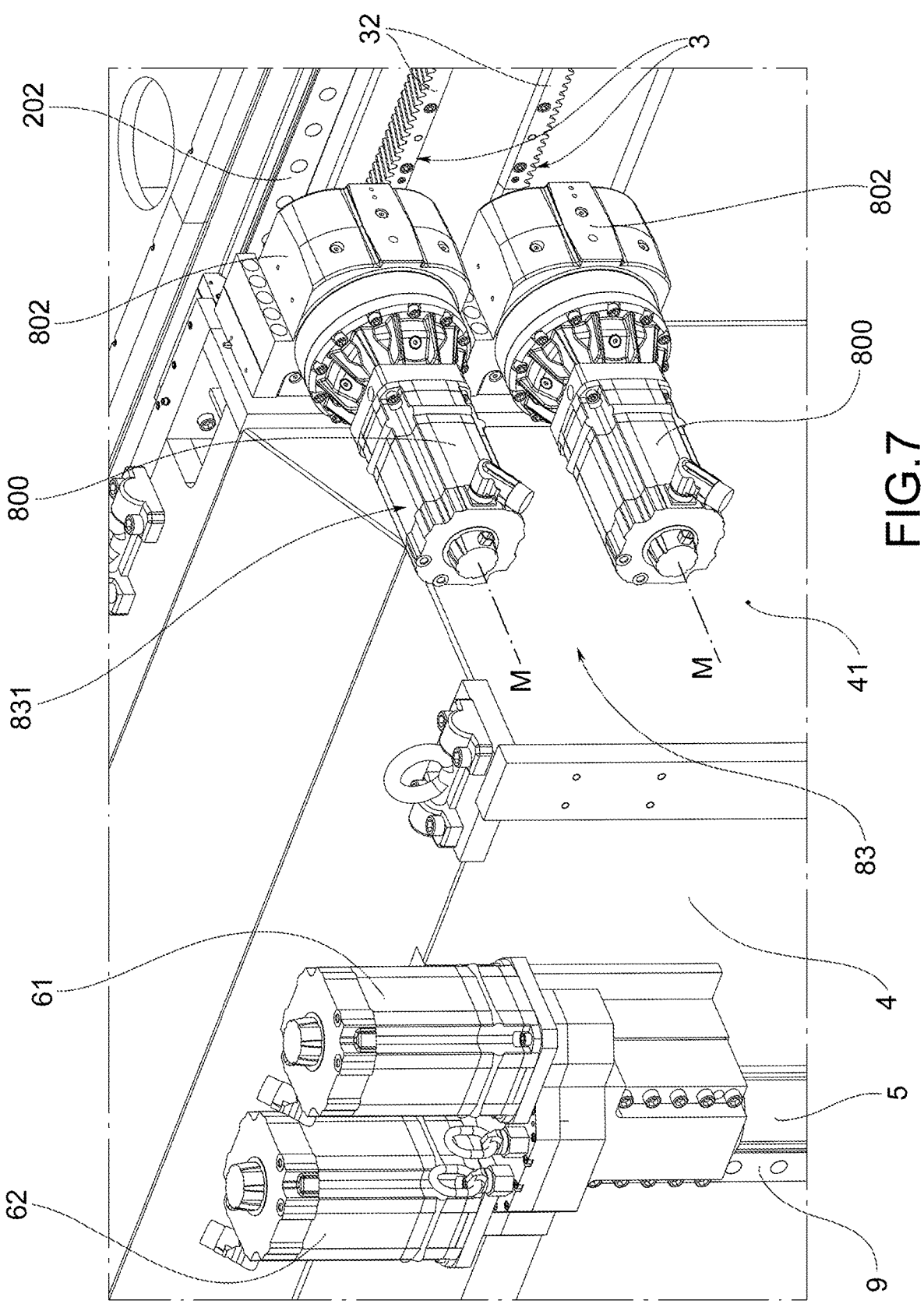
FIG. 7 is an enlarged view of the detail VII highlighted in FIG. 1.
Figure 8:
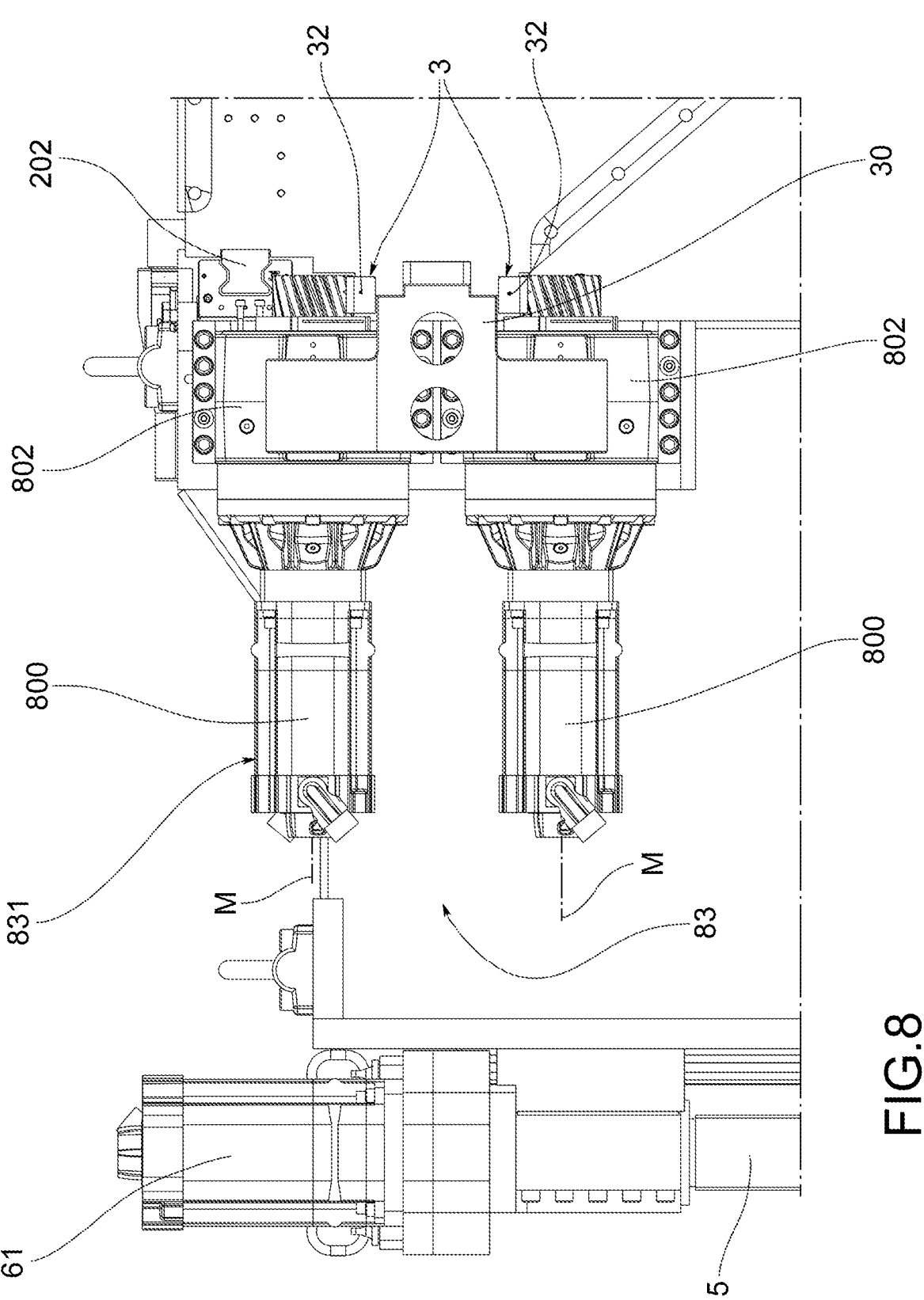
FIG. 8 is an enlarged view of the detail VIII in the square in FIG. 4.

According to an embodiment shown in the accompanying FIGS. 6 and 7, the upright translation means 3 comprise a first pair of upright translation members 31 fixed to the bench 20 and a second pair of upright translation members 32 fixed to the rear support 22.

Figure 2:
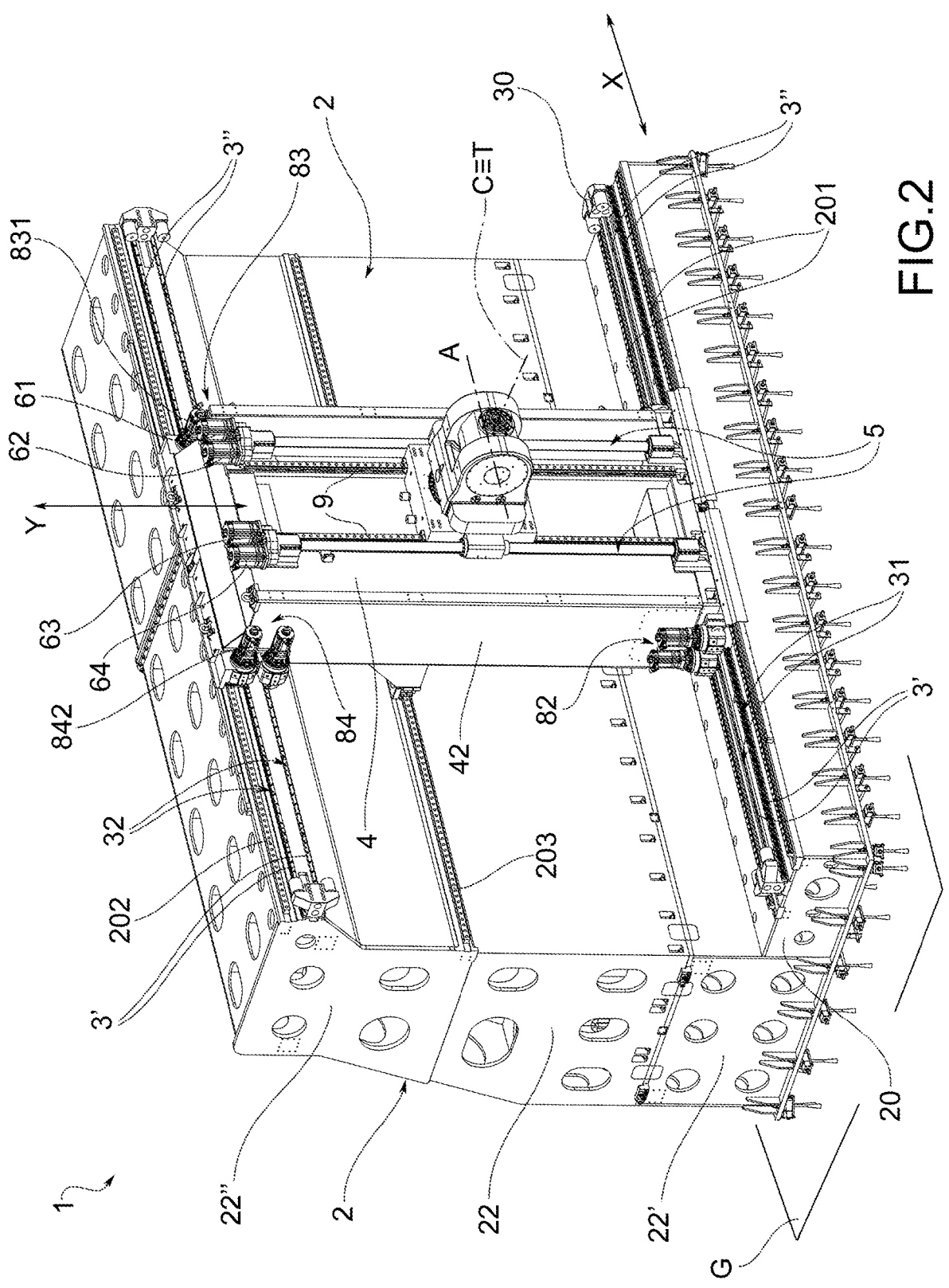
FIG. 2 is a perspective view of the machine tool of FIG. 1 according to a different angle.
Figure 3:
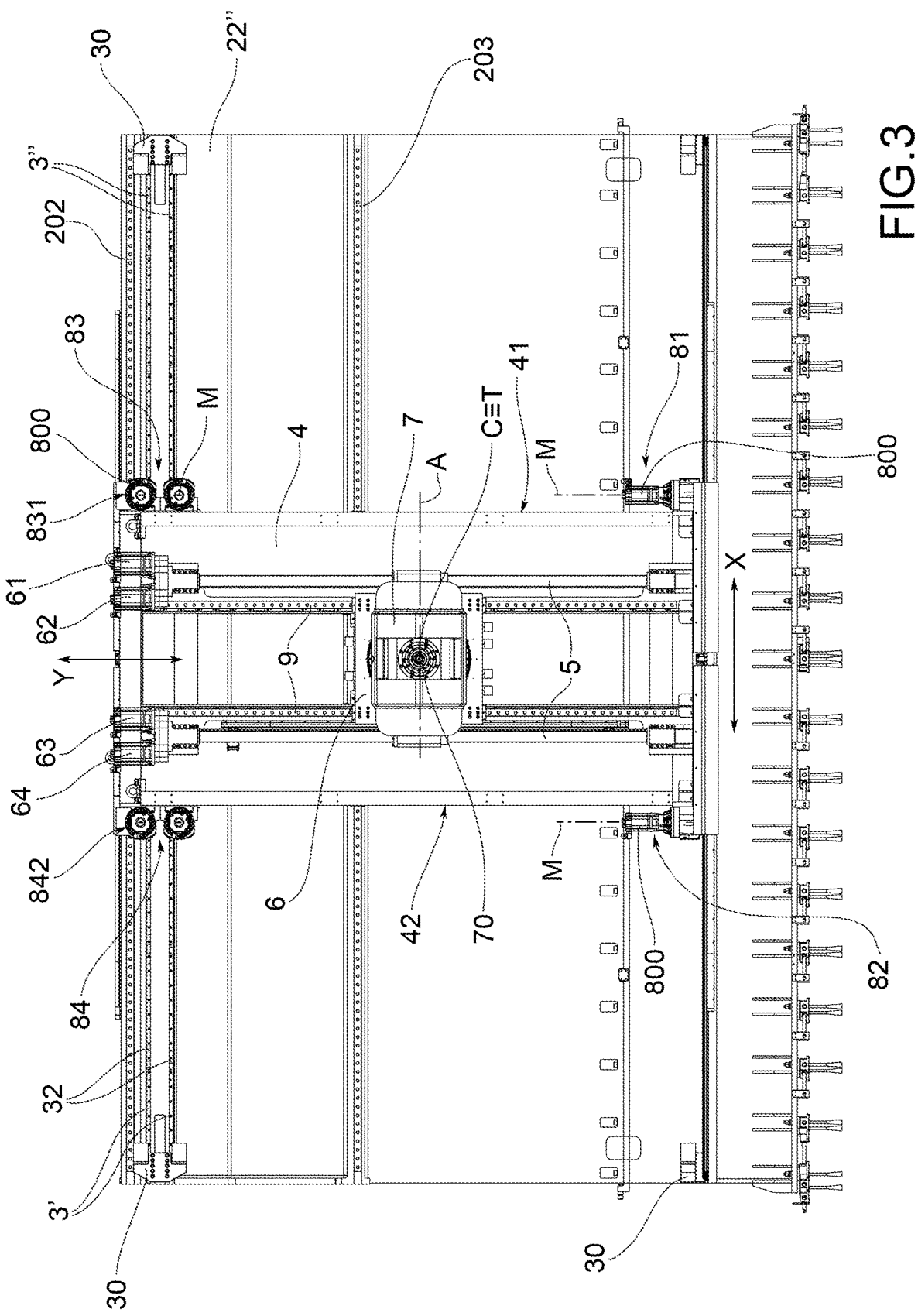
FIG. 3 is a front view of the machine tool of FIG. 1.

According to an embodiment illustrated in the accompanying FIGS. 1 and 2, a first pair of gearmotors 81 and a second pair of gearmotors 82 of the four pairs of gearmotors 81, 82, 83, 84 engage the first pair of upright translation members 31.

Instead, a third pair of gearmotors 83 and a fourth pair of gearmotors 84 of such four pairs of gearmotors 81, 82, 83, 84 engage the second pair of upright translation members 32.

In one embodiment, the first 81 and the third pair of gearmotors 83 are positioned on a first side 41 of the upright 4 whereas the second 82 and the fourth pair of gearmotors 84 are positioned on a second side 42 of the upright 4, opposite to the first side 41.

Said first 41 and second side 42 are lateral with respect to the position of the carriage translation means 5 on which the carriage 6 translates. In other words, the first 41 and the second side 42 are arranged laterally with respect to the carriage 6.

According to an embodiment, a first main gearmotor 831 belonging to the first 81 or to the third pair of gearmotors 83 is a master, while the remaining three gearmotors of the first and third pair of gearmotors are slaves. Furthermore, a second main gearmotor 842 belonging to the second 82 or to the fourth pair of gearmotors 84 is a master, while the remaining three gearmotors of the second and fourth pair of gearmotors are slaves.

Preferably, the first main gearmotor 831 belongs to the third pair of gearmotors 83 and is positioned in proximity to an upper end 22" of the rear support 22. The second main gearmotor 842 belongs to the fourth pair of gearmotors 84 and is positioned in proximity to the upper end 22".

In particular, both on the first side 41 and on the second side 42 of the upright 4 there is a master-slave architecture.

In one embodiment, each upright translation member of the first 31 and of the second pair of upright translation members 32 is a rack. Furthermore, each gearmotor of each of the four pairs of gearmotors 81, 82, 83, 84 comprises an electric motor 800 and a reducer 802. The electric motor 800 has a motor axis M which is parallel to the vertical direction Y. The reducer 802 has an inlet engaged with the electric motor 800 and an outlet engaged with the rack.

The accompanying FIGS. 5-8 illustrate the kinematic chain, where each upright translation member is a rack fixed to the supporting structure and where each gearmotor is fixed aboard the upright 4 and engages with the rack.

Preferably, the inlet and outlet of the reducer 802 are coaxial to the motor axis M and the outlet comprises a toothed wheel which engages with the rack.

According to an embodiment, the carriage translation means 5 comprise a pair of ball screws, wherein each ball screw of such pair of ball screws is actuated by a pair of carriage driving gearmotors 61, 62; 63, 64, which are mounted aboard the upright 4.

In other words, it should be considered that each ball screw of said pair of ball screws which constitute the carriage translation means 5 is driven by a pair of carriage driving gearmotors 61, 62; 63, 64. Therefore, aboard the upright 4 there are also two pairs of carriage driving gearmotors, i.e. a first pair of carriage driving gearmotors 61, 62 and a second pair of carriage driving gearmotors 63, 64.

In particular, the pair of ball screws engages a respective pair of nuts formed on the carriage 6.

According to an embodiment, only one carriage driving gearmotor of the four carriage driving gearmotors 61, 62, 63, 64 forming the two pairs of carriage driving gearmotors 61, 62; 63, 64 is a master, while the remaining three carriage driving gearmotors are slaves.

Therefore, also the actuation of the translation of the carriage 6 along the vertical direction Y is guided by a master-slave architecture.

According to an embodiment, a GANTRY control is provided between each master and the respective slaves.

Therefore, a GANTRY control is also provided on both the first side 41 and the second side 42 of the upright 4. Furthermore, a GANTRY control is also provided between the four carriage driving gearmotors 61, 62, 63, 64.

The GANTRY control is implemented on master-slave architectures where, by means of MIMO (Multiple-Input and Multiple-Output) communication, the slave gearmotors follow the positions controlled by the master and send their feedback data to the master, so as to obtain a closed-loop control.

In one embodiment, the working head 7 is rotatable about a pitching axis A and about a rolling axis C.

Figure 4:
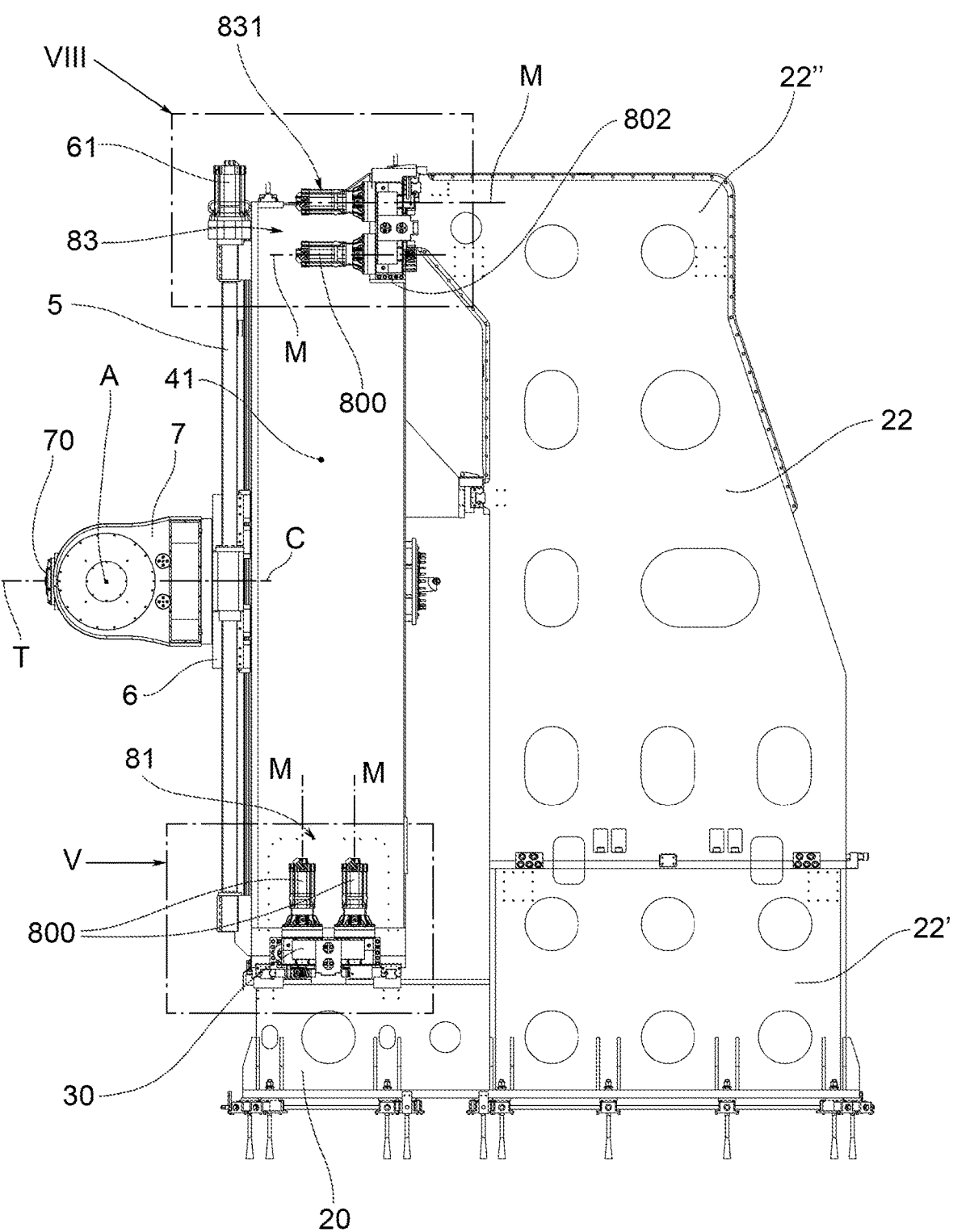
FIG. 4 is a side view of the machine tool of FIG. 1.
Figure 5:
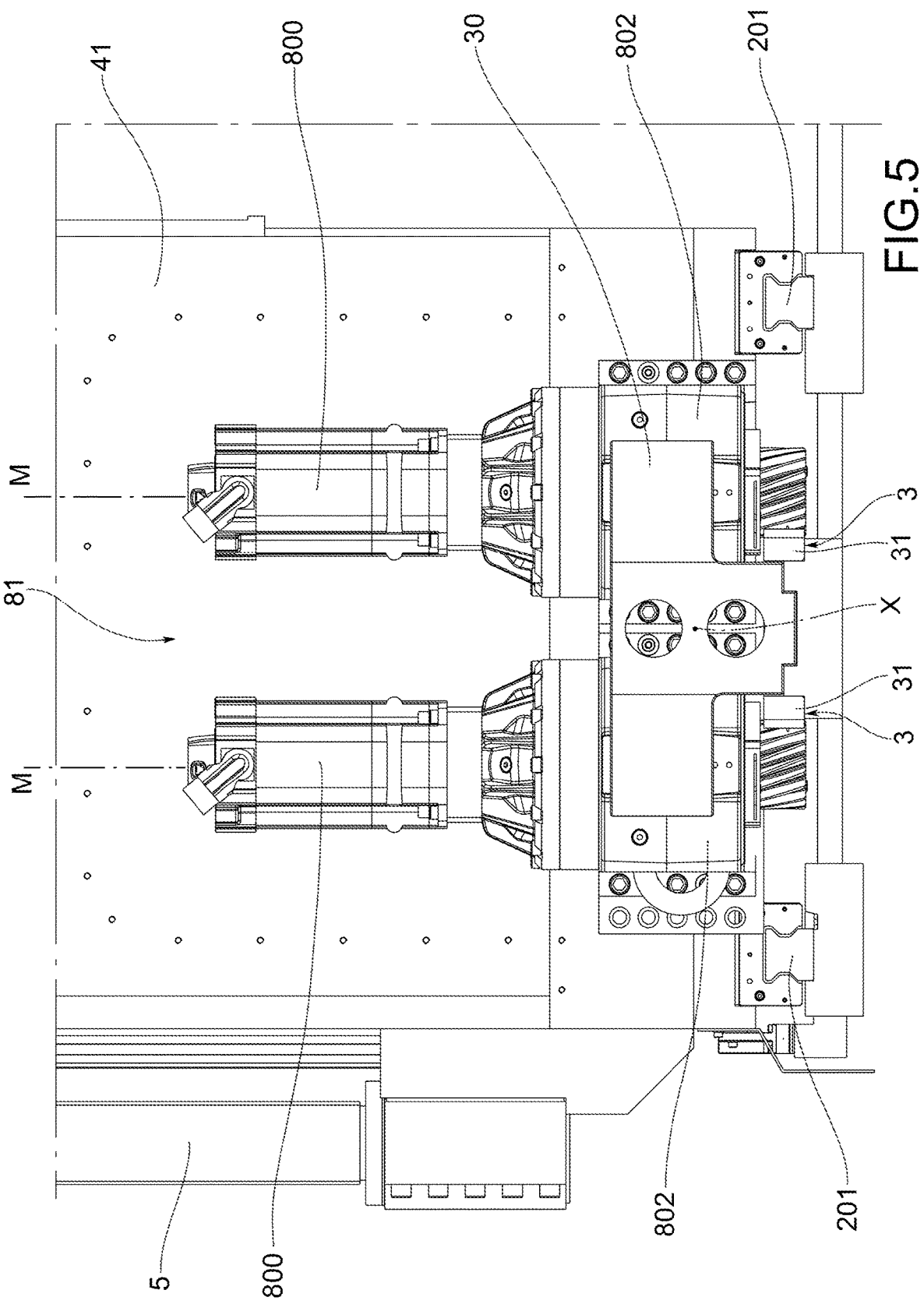
FIG. 5 is an enlarged view of the detail V in the square in FIG. 4.

According to an embodiment illustrated in FIG. 4, the tool holder seat 70 is rotatable about a tool axis T.

It should be noted that, by virtue of the type of machining to be carried out on the semi-finished product, the tool axis T may be collinear or incident with the rolling axis C.

In one embodiment, the bench 20 also comprises a first pair of guides 201 on which the upright 4 slides.

Furthermore, the rear support 22 extends between a lower end 22' connected to the bench 20, and an upper end 22" where, at such upper end, the second pair of upright translation members 32 and a second guide 202 on which the upright 4 slides are positioned.

In an embodiment shown in the accompanying FIGS. 1 and 2, at least a third guide 203 which is fixed to the rear support 22 and on which the upright 4 slides is positioned in between the upper end 22" and the lower end 22'.

Preferably, such third guide 203 is spaced vertically, i.e. along the vertical direction Y, from the second pair of upright translation members 32.

In particular, the first pair of guides 201, the second guide 202 and the third guide 203 are longitudinal sliding tracks, i.e. oriented along the longitudinal direction X.

According to an embodiment, both the first 31 and the second pair of upright translation members 32 extend along the longitudinal direction X between a first end 3' and a second end 3" opposite the first 3'. A position transducer 30, for example an optical ruler, is associated with such first 3' and second 3" ends.

In one embodiment, the upright 4 also comprises a pair of vertical guides 9 on which the carriage 6 slides.

Preferably, also the two vertical guides of this pair of vertical guides 9 are vertical sliding tracks, i.e. oriented along the vertical direction Y.

Innovatively, the machine tool object of the present invention fulfills the intended purpose, as it achieves such a stiffness that the first resonance frequency is comprised in the range between 24 and 30 Hz.

Analytically, following software simulations for finite element analysis (FEA) of the machine tool object of the present invention, it has been calculated that the first resonance frequency is about 30 Hz. Considering that the value obtained is the result of a model that represents a simplification of reality, it was decided in favor of safety to consider 80% of the calculated value. Therefore, the first conservatively calculated resonance frequency is equal to 24 Hz, i.e. 80% of the result obtained through FEA simulations.

Advantageously, the machine tool object of the present invention is more rigid than the machine tools according to the prior art.

Contrary to the technical prejudice, which sought to improve the rigidity of the machines by only increasing the rigidity of the structures, in the present invention the degrees of constraint between the upright and the supporting structure have been increased.

The increase in stiffness and in the value of the first resonant frequency were achieved when passing from the solution with only four gearmotors engaged with the upright translation means, contemplated by the prior art, to the present invention in which four pairs of gearmotors engaged with the upright translation means have been introduced. Therefore, the constraint between the upright and the supporting structure has changed from four to eight degrees.

Analytically, it has been observed that the increase in degrees of constraint between the upright and the supporting structure produces an increase in the resonance frequency such as to be able to machine the titanium alloys in absolute safety and in compliance with the required tolerances. In other words, it has been observed that by replacing each gearmotor with a pair of smaller gearmotors, the overall rigidity of the machine increases considerably and its dynamic performances improve.

According to an advantageous aspect, the machine tool object of the present invention is safe, since it operates on frequencies far from the resonant frequency of the machine itself.

According to a still further advantageous aspect, the machine tool object of the present invention has a lower manufacturing cost or comparable with the machine tools according to the prior art.

It is clear that those skilled in the art, in order to satisfy contingent needs, may make modifications to the machine tool described above, or replace elements with other functionally equivalent ones, without however departing from the scope of protection of the following claims. Each of the features described as belonging to a possible embodiment may be obtained independently in the other described embodiments.

The invention claimed is:

1. A machine tool suitable to machine semi-finished aluminum alloy or titanium alloy products and designed to rest on a horizontal reference plane, said machine tool comprising:
   a supporting structure comprising a bench having a main extension along a longitudinal direction, and a rear support extending both along the longitudinal direction and along a vertical direction, wherein the bench and the rear support are rigidly connected to each other, and wherein the supporting structure is provided with upright translation means oriented according to the longitudinal direction, wherein the upright translation means comprise a first pair of upright translation members fixed to the bench and a second pair of upright translation members fixed to the rear support;

an upright connected to the supporting structure by the upright translation means so as to translate along the longitudinal direction, said upright comprising carriage translation means oriented according to the vertical direction;
   a carriage connected to the upright by the carriage translation means so as to be translatable along the vertical direction; and
   a working head engaged with the carriage and carrying a tool holder seat suitable to house a tool for chip removal machining,
   wherein the machine tool further comprises four pairs of gearmotors positioned aboard the upright and engaged with the upright translation means, wherein a first pair of gearmotors and a second pair of gearmotors of said four pairs of gearmotors engage the first pair of upright translation members, and wherein a third pair of gearmotors and a fourth pair of gearmotors of said four pairs of gearmotors engage the second pair of upright translation members.

2. The machine tool of claim 1, wherein the first and third pairs of gearmotors are positioned on a first side of the upright, and wherein the second and fourth pairs of gearmotors are positioned on a second side of the upright, opposite to the first side.

3. The machine tool of claim 2, wherein a first main gearmotor belonging to the first or third pair of gearmotors is a master and the remaining three gearmotors of the first and third pairs of gearmotors are slaves, and wherein a second main gearmotor belonging to the second or fourth pair of gearmotors is a master and the remaining three gearmotors of the second and fourth pairs of gearmotors are slaves.

4. The machine tool of claim 1, wherein each upright translation member of the first and second pairs of upright translation members is a rack, and wherein each gearmotor of the four pairs of gearmotors comprises an electric motor having a motor axis parallel to the vertical direction and a reducer having an inlet engaged with the electric motor, and an outlet engaged with the rack.

5. The machine tool of claim 1, wherein the carriage translation means comprise a pair of ball screws, and wherein each ball screw of said pair of ball screws is actuated by a pair of carriage driving gearmotors, mounted aboard the upright.

6. The machine tool of claim 5, wherein only one carriage driving gearmotor of the four carriage driving gearmotors forming the two pairs of carriage driving gearmotors is a master, while the remaining three carriage driving gearmotors are slaves.

7. The machine tool of claim 3, wherein the carriage translation means comprise a pair of ball screws and each ball screw of said pair of ball screws is actuated by a pair of carriage driving gearmotors mounted aboard the upright, wherein only one carriage driving gearmotor of the four carriage driving gearmotors forming the two pairs of carriage driving gearmotors is a master, while the remaining three carriage driving gearmotors are slaves, and wherein a gantry control is provided between each master and the respective slaves.

8. The machine tool of claim 1, wherein the working head is rotatable about a pitching axis and a rolling axis.

9. The machine tool of claim 8, wherein the tool holder seat is rotatable about a tool axis.

10. The machine tool of claim 1, wherein the bench comprises a first pair of guides on which the upright slides, and wherein the rear support extends between a lower end connected to the bench, and an upper end, the second pair of upright translation members and a second guide on which the upright slides being positioned at said upper end.

11. The machine tool of claim 10, wherein at least a third guide fixed to the rear support and on which the upright slides is positioned in between the upper end and the lower end.

12. The machine tool of claim 1, wherein both the first pair of upright translation members and the second pair of upright translation members extend along the longitudinal direction between a first end and a second end opposite to the first end, said first and second ends being associated with a position transducer.

13. The machine tool of claim 1, wherein the upright further comprises a pair of vertical guides on which the carriage slides.

14. The machine tool of claim 1, wherein the horizontal reference plane is a ground plane.

15. The machine tool of claim 12, wherein the position transducer is an optical ruler.

\* \* \* \* \*